United States Patent

Magnollay et al.

[11] Patent Number: 5,186,957
[45] Date of Patent: Feb. 16, 1993

[54] EXTRUSION LINE FOR SHEATHING ELONGATED METAL ELEMENTS

[75] Inventors: Gilbert Magnollay, Chexeaux; Rémy Seigneur, Grandvaux; Jacques Budry, Morrens; Jean-Claude Clément; Michel Jaccottet, both of Ecublens; Pierre-Yves Jaggi, Lausanne; Hans Jaun, La Conversion; Philip De Boer, Bursinel, all of Switzerland

[73] Assignee: Nokia - Maillefer Holding SA, Ecublens, Switzerland

[21] Appl. No.: 676,364

[22] Filed: Mar. 28, 1991

[30] Foreign Application Priority Data

Apr. 3, 1990 [CH] Switzerland .......................... 1116/90
Apr. 3, 1990 [CH] Switzerland .......................... 1117/90

[51] Int. Cl.⁵ ........................................... B29C 47/12
[52] U.S. Cl. .................. 425/192 R; 425/188; 425/190; 425/380
[58] Field of Search ................ 425/188, 190, 192, 380, 425/381, 382.4, 133.1, 462, 113

[56] References Cited

U.S. PATENT DOCUMENTS

| 2,364,566 | 12/1944 | Stupakoff et al. | 425/192 |
|---|---|---|---|
| 3,001,485 | 9/1961 | Czic | 425/190 |
| 3,734,662 | 5/1973 | Harmon et al. | 425/190 |
| 3,902,835 | 9/1975 | Theysohn | 425/188 |
| 4,137,027 | 1/1979 | Rüger | 425/188 |
| 4,140,449 | 2/1979 | Takeshi et al. | 425/188 |
| 4,358,261 | 11/1982 | Ohki | 425/192 |
| 4,652,224 | 3/1987 | Golisch | 425/188 |
| 4,799,874 | 1/1989 | Bellmer et al. | 425/190 |
| 5,061,166 | 10/1991 | Gohlish et al. | 425/133.5 |

FOREIGN PATENT DOCUMENTS

| 3629096 | 3/1988 | Fed. Rep. of Germany . |
|---|---|---|
| 2601619 | 1/1988 | France . |
| 587117 | 4/1977 | Switzerland . |
| 2083401 | 3/1982 | United Kingdom . |

Primary Examiner—David A. Simmons
Assistant Examiner—William J. Matney, Jr.
Attorney, Agent, or Firm—Oliff & Berridge

[57] ABSTRACT

An extrusion head (12) is mounted on a support (11) borne by a movable assembly (8). By rotation of two arms (9 and 10) about their pivoting axes on a base (6), the extrusion head is moved from a preparation position to a working position. Beforehand, another extrusion head (14) which had been in working position was removed after opening of a clamp (21) and maneuvering of another movable assembly (18) so as to reach the preparation position, where new tooling can be put in place, adjusted, and regulated, and where the extrusion head can be preheated.

11 Claims, 4 Drawing Sheets

EXTRUSION LINE FOR SHEATHING ELONGATED METAL ELEMENTS

FIELD OF THE INVENTION

This invention relates to extrusion equipment, and more particularly to an extrusion line for the continuous production of an elongated metal element provided with a sheath of plastic material, of the type comprising an exchanging apparatus capable of being equipped with two extrusion heads and of moving each of them alternately between a working position and a preparation position, the extrusion head situated in working position being connected to an orifice for the passage of plastic material.

DESCRIPTION OF THE RELATED ART

One of the problems encountered in the development of the most efficient extrusion lines possible resides in the rapid changing of the extrusion tooling. It may be necessary to produce successively segments of sheathed wire or electric cable using the same or several extruders, but modifying, say, the outside and inside diameters of the insulation, from one segment to another by an appropriate arrangement of the extrusion tooling.

Until now, the operations necessary for carrying out these modifications comprised shutting down the line, dismantling the extrusion tooling in working position on the line, mounting new tooling, cleaning certain parts of the head, if necessary, regulating and adjusting the tooling, pre-heating the new head, and putting it in place. It will be realized that this sequence of operations has necessitated a rather long shutdown which could disturb the operation of the extruder or extruders in service. In any event, such exchanges have occasioned substantial down times.

In order to remedy these drawbacks, it has been proposed to equip an extrusion line with exchanging apparatus capable of receiving two extrusion heads, one of which is in working position and the other in preparation position. Thus, for example, Swiss Patent No. 587,117, French Patent No. 2,601,619, and U.K. Patent No. 2,083,401 describe various kinds of exchanging apparatus.

SUMMARY OF THE INVENTION

It is an object of this invention to provide an improved extrusion line having exchanging apparatus which is more efficient and more accurate than prior art apparatus.

A further object of this invention is to provide extrusion apparatus capable of being inserted in a line which may comprise several different feeds.

To this end, in the extrusion line according to the present invention, of the type initially mentioned, the exchanging apparatus comprises, on a base fixed with relation to the orifice, independent means supporting and moving each of the heads, and mechanized means for fluid-tightly fixing the head which is in working position with relation to the orifice.

If need be, the exchanging apparatus can effect the withdrawal of one extrusion head and the placing of a new extrusion head, ready for use, by completely automatic means.

BRIEF DESCRIPTION OF THE DRAWINGS

A preferred embodiment of the invention will now be explained in detail with reference to the accompanying drawings, in which.

DETAILED DESCRIPTION OF THE PREFERRED EMBODIMENTS

Figure 1:
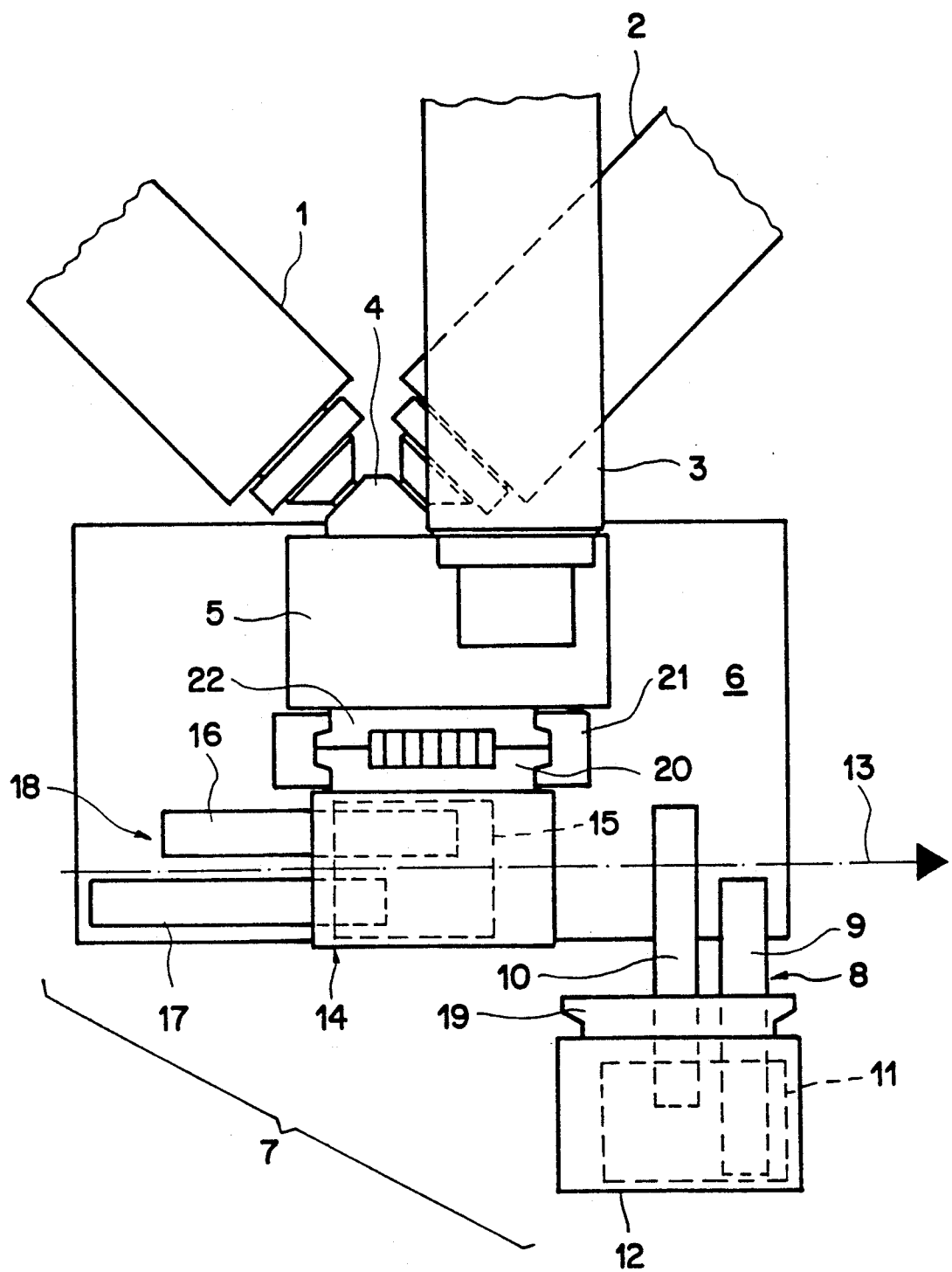
FIG. 1 is a diagrammatic top plan view of part of an extrusion line for the continuous production of insulated electric wire.

Seen in FIG. 1 are certain parts of an extrusion line which do not play any part as concerns the present invention, but which are shown here simply by way of example. The extrusion line comprises three extruders, including two main extruders 1 and 2 and an auxiliary extruder 3. All these extruders are screw-type extruders disposed with their axes in horizontal position. Extruders 1 and 2 are disposed symmetrically on either side of a line perpendicular to the direction of the axis 13 of the extrusion line. In the example illustrated, extruders 1 and 2 are oriented at a 45° angle relative to axis 13. They feed an intake 4 forming part of a connection unit 5 fixed on a base 6. The auxiliary extruder is disposed above extruders 1 and 2. Its axis is oriented perpendicular to axis 13, and its outlet orifice communicates via a conduit (not shown) with connection unit 5 so that the plastic material issuing from the auxiliary extruder moves vertically downward to enter unit 5.

The extrusion line likewise comprises, mounted on base 6, an exchanging apparatus 7 comprising a first movable assembly 8 formed of two arms 9 and 10 disposed horizontally, parallel to one another and both pivoting about vertical axes, independently of one another, on base 6. The outer ends of arms 9 and 10 are hinged to a support 11 on which an extrusion head 12 is fixed. Together with base 6, assembly 8 forms a parallelogram rotatable about the joints of arms 9 and 10 on base 6, communicating a circular translatory motion to support 11 and extrusion head 12. The joints of arms 9 and 10 on base 6 are situated on either side of axis 13 of the extrusion line.

A second movable assembly 18 comprises an extrusion head 14 mounted on a support 15, hinged to which are two horizontal arms 16 and 17 pivoting, symmetrically to arms 9 and 10, on base 6. Movable assembly 18 is capable of communicating to extrusion head 14 a circular translatory motion symmetrical to that effected by head 12.

Each of the extrusion heads 12 and 14 is equipped with a connection part 19, 20. Base 6, on the other hand, bears a double-jawed locking device 21, while connection unit 5 is equipped, like heads 12 and 14, with a connection part 22 capable of co-operating with automatic clamp 21 and one or the other of the connection parts 19, 20 so as to connect the intake conduit or conduits of the head 12 or 14 which is in working position to the inner ducts of connection unit 5, these inner ducts opening out under a passage orifice. The arrangement of these connection elements is the subject of a separate patent application being filed on the same day as the present patent application, so that it needs no detailed description here.

Figure 2:
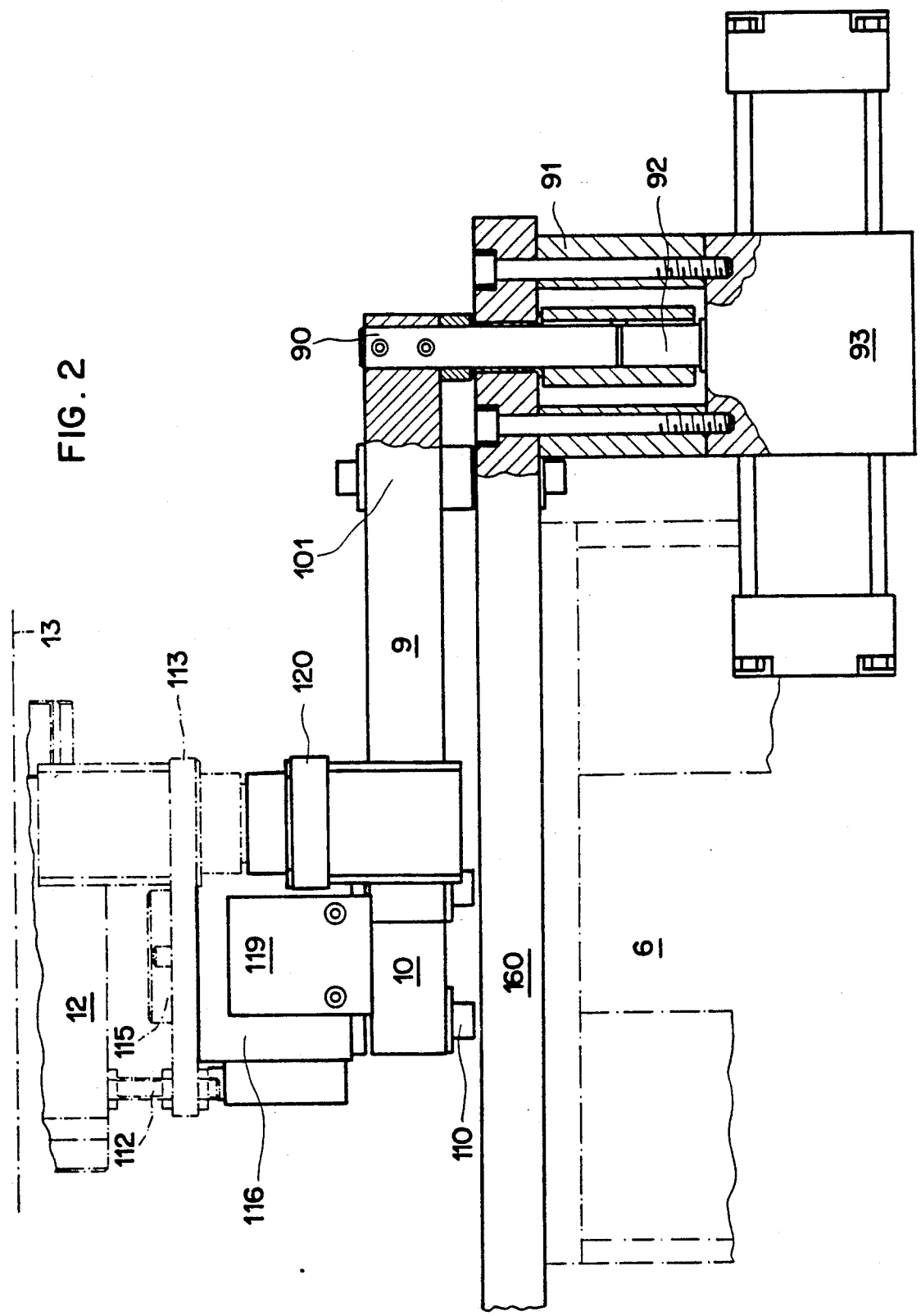
FIG. 2 is a partial elevation, partially in section of an exchanging apparatus forming part of the line of FIG. 1.
Figure 3:
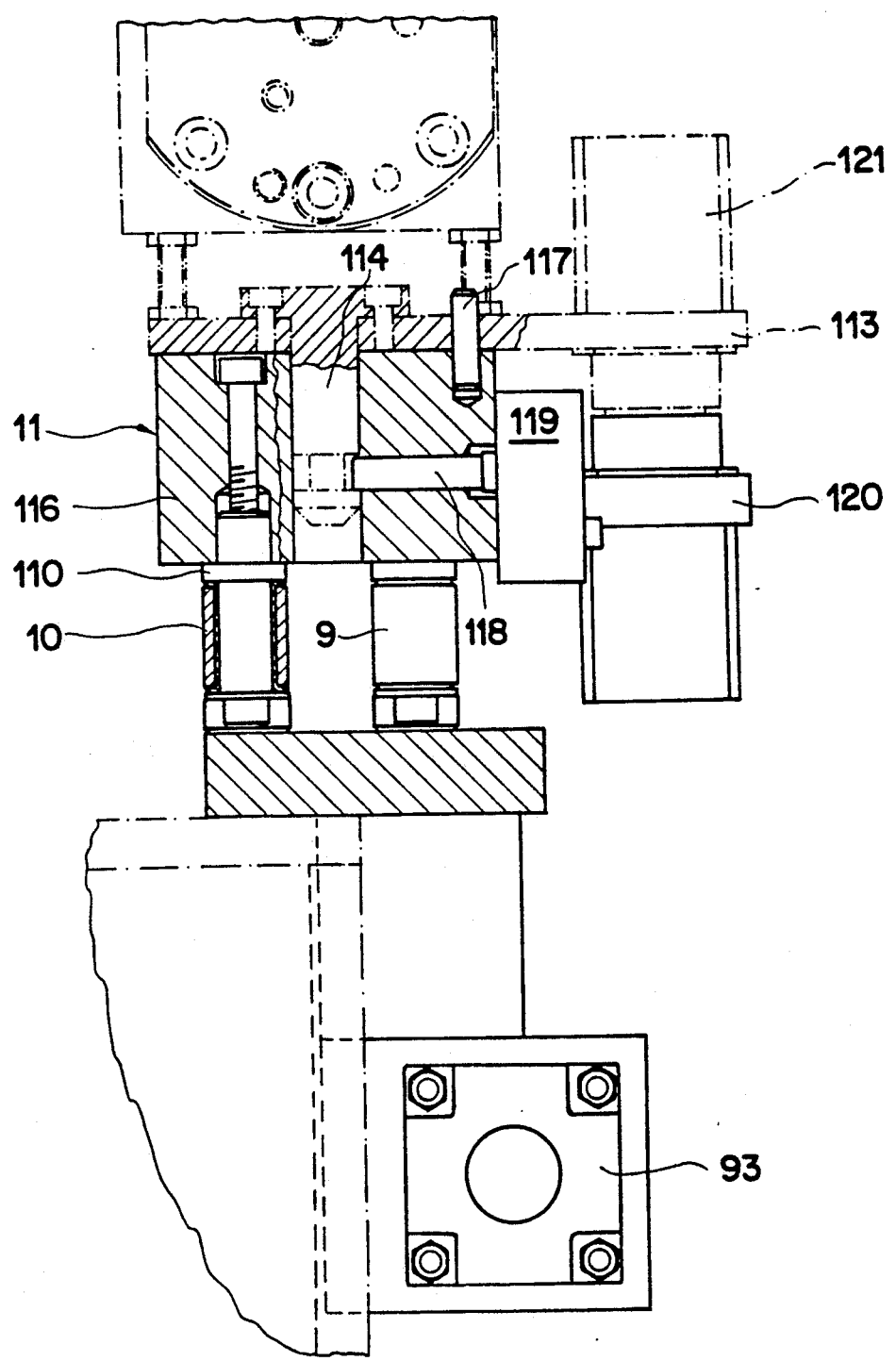
FIG. 3 is a section through the exchanging apparatus of FIG. 2 taken on planes perpendicular to the axis of the line.

As concerns the movable assemblies, on the other hand, FIGS. 2 and 3 reveal their design in more detail in a preferred embodiment. In these drawing figures, head 12 is seen in working position, the axis of the extrusion line again being indicated by line 13. Extrusion head 12 is supported by four bolts 112 fixed on a rectangular plate 113. A positioning rod 114 (FIG. 3), provided with a flat head 115, is fitted in a hole in plate 113 and likewise enters a matching bore in a support 116. A pin 117 and positioning rod 114 permit head 12 to be precisely positioned relative to support 116, locking being brought about by a rod 118, integral with a jack piston 119 and engaging a groove in positioning rod 114. Arms 10 and 9 are also shown, and FIG. 3 illustrates in more detail the joint between the end of arm 10 and a spindle 110 fixed to support 116.

It is further seen in FIG. 2 that the ends of arms 9 and 10, joined to base 6, or more precisely to a base plate 160 fixed to base 6, are integral, as concerns arm 9, with a vertical rod 90 made integral by two pins with arm 9. Rod 90 passes through an opening in base plate 160 and is coupled by means of a sleeve 91 to the output shaft 92 of a pinion seated within a rack-type jack 93. It is this jack which constitutes the driving element of movable assembly 8. It will be realized that arm 10, hinged to plate 160 about an axis 101, rotates freely about its joint when arm 9 is controlled by jack 93.

The electric connector terminal 120 which is fixed to block 116, and the plugs of which are automatically connected to a connector terminal 121, corresponding to terminal 120 but mounted on plate 113 of head 12, should further be noted. These connections permit especially the preheating of head 12 and of its tooling, as well as the measurement of its temperature.

The connection is effected automatically by means of locking clamp 21. This clamp comprises firstly a jack 212, the cylinder of which is fixed relative to connection unit 5. The rod of jack 212 moves vertically, as viewed in FIG. 4, and bears at the top a stirrup 213, the upper ends of the two arms of which support a spindle 214. This spindle passes through two small rods 215 which connect stirrup 213 to a first jaw 216 and, on the other hand, a small rod 217 which connects spindle 214 to a frame element 218. This frame element is integral with two rods 219 and 230 which slide in bores of jaw 216, and the ends of which bear jaw 230.

Frame 218 is in turn connected by a support 231 to a joint 233 on jack cylinder 212.

Figure 4:
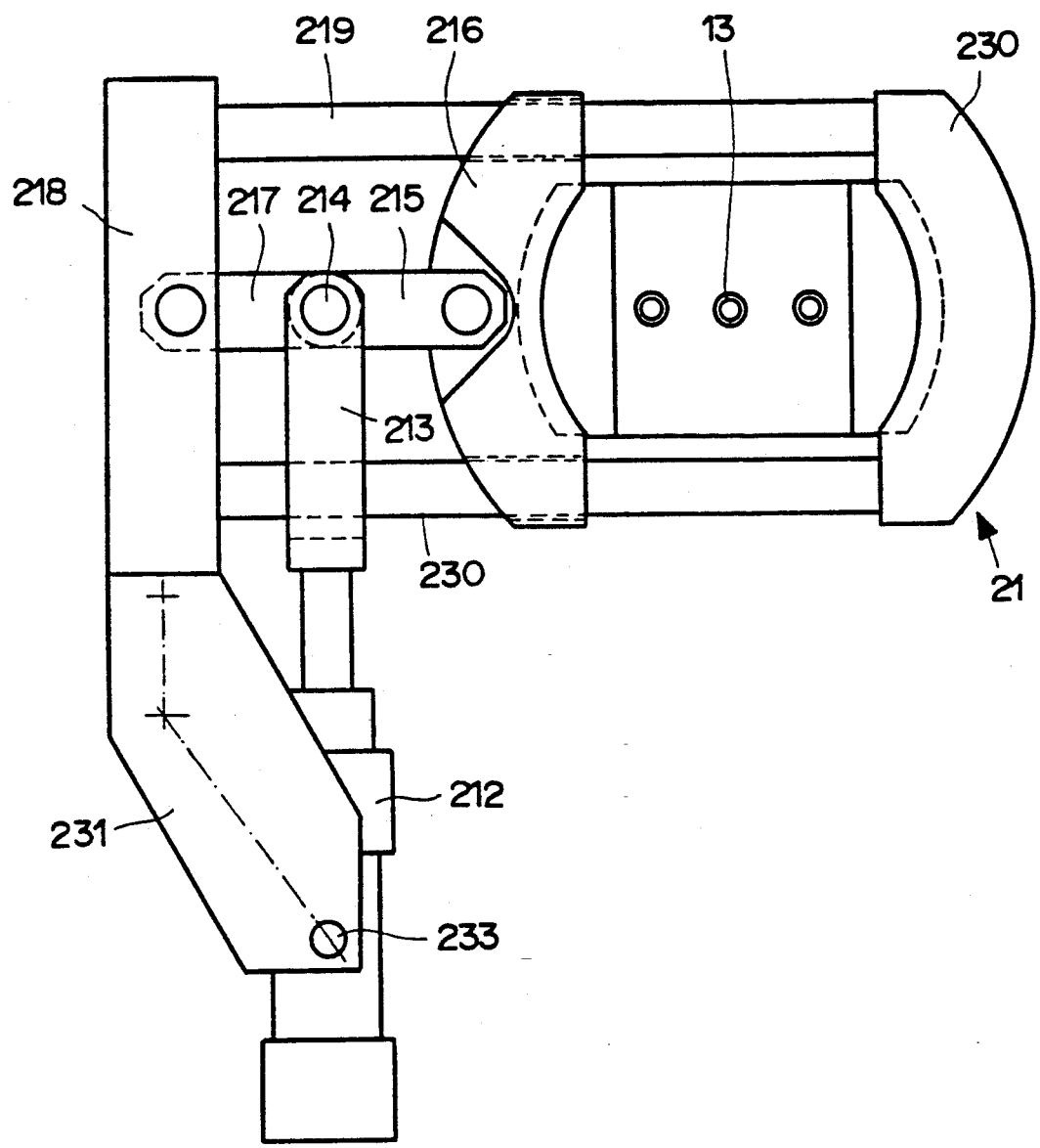
FIG. 4 is an elevation of an automatic clamp.

It will be realized that if, starting from the position shown in FIG. 4, the jack rod is moved so as to retract into cylinder 212, jaws 216 and 230 are moved away from one another by the action of the knuckle-joint 213, 217, 215. Jaws 216 and 230 have arcuate inside grooves with oblique sides which correspond to bevels of connection parts 20 and 22, so that when they are in near position (FIG. 4), jaws 230 and 216 exert on parts 20 and 22 forces which press them flat against one another and which, consequently, establish the connection between the matching passage orifices of elements 20 and 22.

By means of the exchanging apparatus described above, the structure of a coating on an electric wire or a cable can be changed very rapidly and efficiently. While one of the heads, e.g., head 14, is in working position and the extrusion line is producing the desired conductor, along axis 13, head 12 is in preparation position. In this position, the tooling can be put in place, regulated and adjusted, and preheating can be carried out by connecting terminal 121 to an auxiliary power supply. When the moment arrives for making the exchange of heads, production is interrupted for a few seconds, and the conductor is severed downstream from head 14. The wire is then withdrawn from head 14, clamp 21 is opened, and head 14 is moved into preparation position by operating the jack corresponding to jack 93. The wire can then be inserted into head 12 and this head brought into working position, after which clamp 21 can be reclosed and the extrusion line restarted.

An arrangement of this kind may be provided on extrusion lines operating with a single extruder as well as with complex production lines, the extrusion station of which comprises several extruders disposed along different axes relative to the connection unit. All these extruders remain permanently connected to the connection unit, which is provided with suitable inner ducts.

The exchanging apparatus and the locking clamp are provided with the necessary sensors so that monitoring by computer is possible. All the operations may then be automated.

Of course, it is also possible to design the exchanging apparatus without its operation being completely automatic. The possibility of assembling, adjusting, and preheating an extrusion head in a preparation position, in such a way that it may be put in place by a simple motor-controlled movement at the time of the exchange, ensures a considerable advantage in certain cases, even if the intervention of operators is necessary for certain operations.

What is claimed is:

1. An automated extrusion line for continuously producing an elongated metal element provided with a sheath of material, the extrusion line comprising:
   at least one extruder;
   a connection unit connected to the at least one extruder and having an outlet orifice;
   a plurality of extruder heads, each extruder head having an inlet orifice for connection to the outlet orifice of the connection unit;
   a locking apparatus for connecting one of the plurality of extruder heads to the connection unit; and
   an automatic exchanging apparatus for supporting first and second extrusion heads of the plurality of extrusion heads on a common base, the automatic exchanging apparatus including means for independently pivoting each of the first and second extrusion heads in first and second predetermined arcs, respectively, between a working position in which the inlet orifice of one of the first and second extrusion heads is fluid tightly connectable to the outlet orifice of the connection unit and a preparatory position in which the inlet orifice of one of the first and second extrusion heads is spaced from the outlet orifice, the means for independently pivoting the first and second extrusion heads moving one of the first and second extrusion heads along its predetermined arc to automatically align the inlet orifice of the one extrusion head with the outlet orifice and retracting the other of the first and second extrusion heads to its preparatory position.

2. The automated extrusion line of claim 1, wherein the means for independently pivoting each of the first and second extrusion heads comprises:
   first positioning means for movably supporting and positioning the first extruder head between a first preparatory position and a first working position, the first positioning means mounted on the common base;

second positioning means for movably supporting and positioning the second extruder head between a second preparatory position and a second working position, the second positioning means mounted on the common base; and drive means for independently moving the first and second positioning means, respectively, through the first and second predetermined arcs between the first and second working positions and the corresponding first and second preparatory positions.

3. The automatic exchanging apparatus of claim 2, wherein each of the first and second positioning means comprises:

a first end secured to said common base;

a second end provided with a support plate; and a support means provided on said support plate for fixedly receiving one of said plurality of extruder heads;

the support plates of said first and second positioning means defining a common plane, wherein the first and second predetermined arcs lie within said common plane.

4. The automatic changing apparatus of claim 2, wherein at least one of the first and second positioning means detachably supports, respectively, the first and second extruder heads such that at least one of the first and second extruder heads is exchangeable with another of the plurality of extruder heads.

5. The automatic changing apparatus of claim 2, wherein the first positioning means further comprises an auxiliary heating means for pre-heating the first extruder head when in the first preparatory position, the second positioning means further comprises an auxiliary heating means for preheating the second extruder head when in the second preparatory position and the connection unit further comprises a primary heating means for heating the one extruder head when in the working position.

6. The automated extrusion line of claim 2, further comprising control means for automatically and simultaneously actuating the first and second positioning means along said first and second predetermined arcs, wherein said first extrusion head moves between said working position and said first preparatory position while said second extrusion head moves between said second preparatory position and said working position.

7. The automated extrusion line of claim 3, wherein each of said plurality of extrusion heads and each of said support plates are provided with corresponding electrical connecting means and electrical current leading means for electrically actuating an electric device incorporated into each of said plurality of extrusion heads while each extrusion head is secured to said respective support plate.

8. The automated extrusion line of claim 3, wherein each of said first and second positioning means comprises a pair of parallel rigid arms, first pivoting means for pivotably mounting one end of each of said arms to the support plate, and second pivoting means for pivotably mounting the other end of one of said arms to the common base, and each of said actuating means comprises means for rotatably actuating said second pivoting means, to control circular translational movement of the support plate between said working position and one of said first and second preparatory positions.

9. The automated extrusion line of claim 8, wherein each of said actuating means further comprises a jack borne by said common base, each jack being adapted to actuate one of said arms.

10. The automated extrusion line of claim 1, wherein each of said at least one extruder includes an outlet opening, said connection unit further comprising at least one duct for connecting said one of said plurality of extrusion heads in said working position to said at least one extruder, and said locking means fluid-tightly connecting said one of said plurality of extrusion heads in said working position to said connection unit for connecting said inlet orifice to said at least one duct.

11. The automated extrusion line of claim 1 wherein said automated exchanging apparatus comprises motor means and control means for automatically displacing one of said first and second extrusion heads from said working position to one of said first and second preparatory positions and displacing the other of said first and second extrusion heads from the other of said first and second preparatory positions to said working position.

* * * * *